A. JANISHEFSKI.
HEADLIGHT CONTROLLER.
APPLICATION FILED AUG. 1, 1911.
1,004,878.
Patented Oct. 3, 1911.
2 SHEETS—SHEET 2.
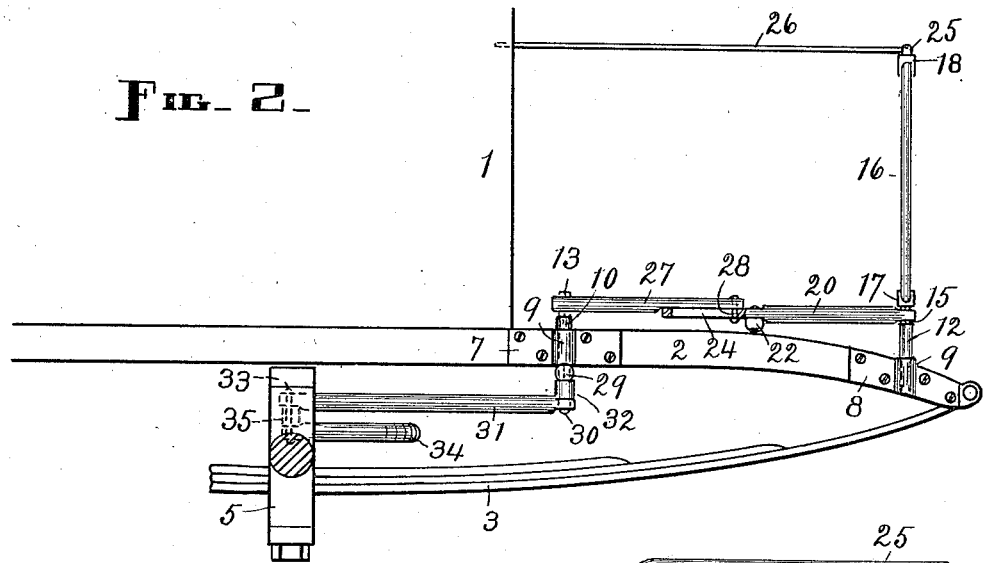
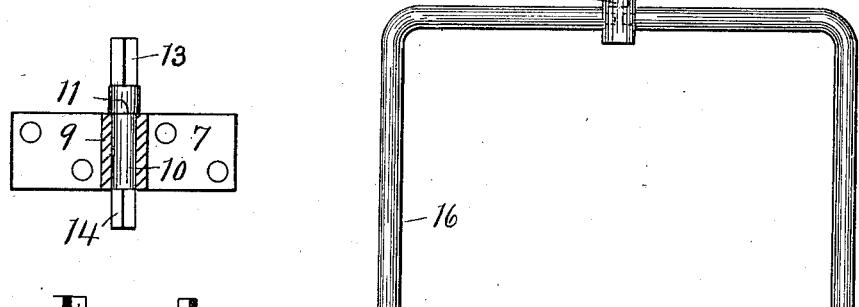
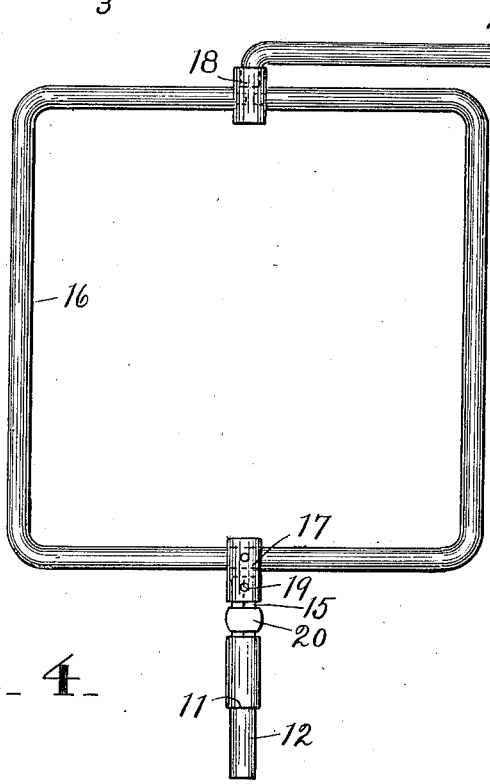
WITNESSES:
A. C. Fairbanks
J. M. Davenport
INVENTOR.
Andrew Janishefski,
BY Webster & Co.,
ATTORNEYS.

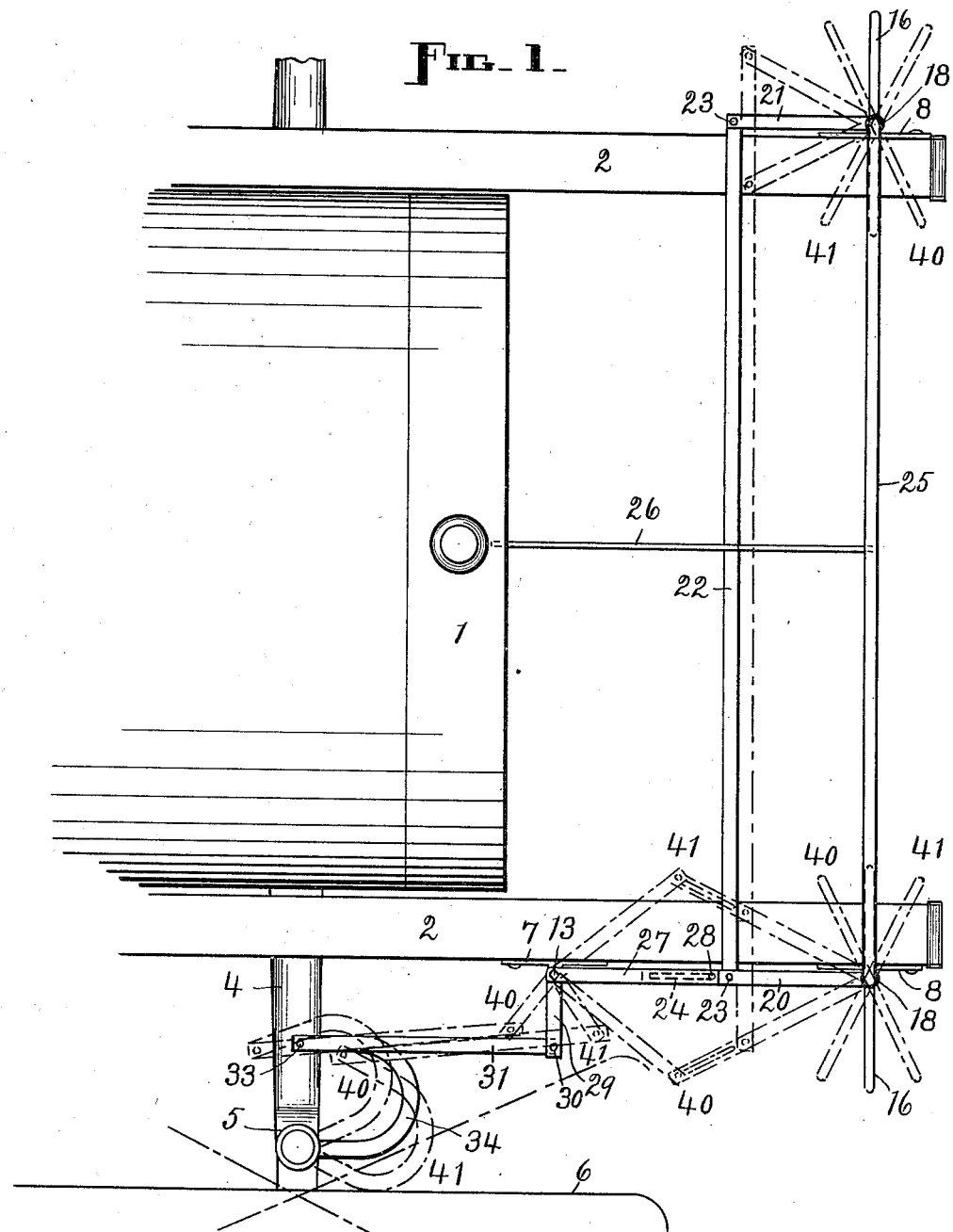

UNITED STATES PATENT OFFICE.

ANDREW JANISHEFSKI, OF CHICOPEE FALLS, MASSACHUSETTS.

HEADLIGHT-CONTROLLER.

1,004,878.      Specification of Letters Patent.      Patented Oct. 3, 1911.

Application filed August 1, 1911. Serial No. 641,719.

*To all whom it may concern:*

Be it known that I, ANDREW JANISHEFSKI, a citizen of the United States of America, residing at Chicopee Falls, in the county of Hampden and State of Massachusetts, have invented a new and useful Headlight-Controller, of which the following is a specification.

My invention relates to improvements in controlling means for the front lamps or head-lights of vehicles such as automobiles, and consists of certain peculiar lamp-supporting means and mechanism connected with and operated by one of the front-wheel steering-knuckles of a vehicle for actuating such lamp-supporting means simultaneously with the action of said steering-knuckle, all as hereinafter set forth.

The object of my invention is to provide for an automobile dirigible supports for the front lamps, and directing means or mechanism for such supports, such mechanism being in operative connection with a front steering-knuckle of the machine, and so constructed and arranged that the aforesaid supports are caused to swing upon vertical axes in synchronism with the front-wheel steering-gear of said machine in such a manner that the rays of light from the lamps always illuminate the path to be traversed by the machine, whether the latter be traveling in a straight course or making a turn.

A further object is to provide such a controller which is comparatively simple and inexpensive in construction, is adaptable to various kinds of machines by lengthening or shortening certain of the members which enter into the controller mechanism, and is easily applied.

Other objects will appear in the course of the following description.

A preferred form of embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of the invention.

In the drawings, in which like numerals designate like parts throughout the several views, Figure 1 is a top plan of my controller and of so much of an automobile as is needed to support and operate the same, what may be termed the normal positions of the parts being shown in full lines and other positions by dot-and-dash lines; Fig. 2, a side elevation of the parts and members which appear in the preceding view; Fig. 3, an enlarged side elevation of the back post, the bracket therefor being in partial section, and, Fig. 4, an enlarged front elevation of one of the lamp supports or frames together with the post therefor at the bottom and the connected terminal of the stay-rod at the top.

The following parts of an automobile are represented in the first two views: The front portion of a radiator 1, the forward portions of two side supports 2 and two springs 3 beneath the same, and a front axle 4 with a steering-knuckle 5 at one end. The inner outline of a portion of a front wheel is indicated at 6, in Fig. 1. These members, although differing more or less in different types of machines, are common to all and need not be described in detail.

Fastened securely to the outside of one of the supports 2, at a suitable point between the front end of the support and the vertical plane of the axle 4, is a bracket 7. The exact position of this bracket is determined by the distance between the axle 4 and the front end of the support 2 which carries said bracket, or between said axle and the lamp supports, and by the longitudinal proportions of certain of the controller members, as will appear from the further description of the controller. Two brackets 8 are securely fastened against the outside faces of the supports 2 adjacent to the front ends of the latter, said brackets being equidistant from the axle 4. Each of the brackets 7 and 8 consists in part of a vertical sleeve 9. A post 10 is journaled in the bracket 7, a shoulder 11 on such post resting on top of the bracket sleeve 9, and a post 12, also shouldered at 11 for the same purpose as in the other case, is journaled in each of the brackets 8. The post 10 has an angular stem 13 above its shouldered part, and an angular stem 14 below the supporting sleeve 9, and each post 12 has an angular stem 15 above its shouldered part.

Suitable vertical supporting frames 16 (for the lamps which are not herein shown) are provided, and each of these has a socket 17 in the center of its base member and a socket 18 in the center of its top member.

The sockets 17 are recessed to fit the stems 15 of the posts 12, upon which stems said sockets are placed and to which they are fastened by means of transverse pins, one of such pins appearing at 19, in Fig. 4. Rearwardly-extending arms 20 and 21 are attached to the stems 15, below the sockets 17, and a connecting-rod 22 has its ends pivoted to said arms at 23—23. Since the stems 15 and the openings for them in the sockets 14 and in the arms 20 and 21 are angular, any oscillatory movement imparted to the arm 20 is transmitted to the posts 12 and the frames 16 in the form of a partial rotation.

The arrangement of the parts described in the preceding paragraph is such that the arms 20 and 21 are at right-angles to the frames 16, and, when said frames stand parallel with the axle 4, which is fixed, the connecting-rod 22 is at right-angles to said arms. The connecting-rod is attached to the arm 20 intermediate of the ends of said arm and to the arm 21 at its rear end. The arm 20 has a longitudinal vertical slot 24 therein in that part which is behind the adjacent pivot 23, such arm being broken away, in Fig. 2, to show such slot.

The frames 16 are supported and stayed at the top by means of a horizontal stay-rod 25 which has its ends turned down and inserted in the sockets 18, and a rod 26 which is rigidly attached at its rear end to the radiator 1 and has said stay-rod rigidly attached to its front end. The sockets 18 fit the vertical terminals of the stay-rod 25 loosely so that the frames 16 can turn freely.

A lever 27 connects the arm 20 with the post 10, the front end of said lever being pivoted through the slot 24 to said arm, at 28, and the rear end of said lever being fitted to the stem 13 so that the lever turns with the post. Under normal conditions, or when the frames 16 are parallel with the axle 4, the lever 27 is at right-angles to said frames, or in line with the arm 20.

Fitted to the stem 14 at the bottom of the post 10 is a short arm 29. This is the member that directly operates the post 10, and said member is arranged at right-angles to the lever 27. The inner end of the arm 29 is attached to the post 10 and the outer end of said arm is pivoted at 30 to the front end of a connecting rod 31, a collar 32 being interposed between said arm and connecting-rod on the pivot. The rear end of the connecting-rod 31 is pivoted at 33 to a curved operating arm 34, with a collar 35 between. The operating arm 34 has one terminal inserted in the steering-knuckle 5 and is so shaped and positioned that, when said steering-knuckle stands so as to retain the wheel 6 in parallel relation with the adjacent support 2, the pivot 33 is located in the same vertical plane with the axis of said steering-knuckle, which plane is at right-angles to the longitudinal center of the machine. In other words, the radius of the steering-knuckle 5 which passes through the pivot 33 is parallel with the axle 4 when the controller mechanism is normally disposed, the wheel 6 and the lamp frames 16 being set for straight-ahead. By thus locating the pivot 33, it is possible to actuate the frames 16 in both directions as the movements of the steering-knuckle cause said pivot to swing behind the position just described and in front of such position, the pivot describing an arc having the axis of said steering-knuckle for its center; and the amount of partial rotation of said frames in both directions is approximately the same, provided the travel of the pivot in both directions from initial or normal position be the same, while the angle of displacement of each frame approximates that of the wheel. It follows, therefore, that the rays of light from lamps carried in the frames 16 are always directed along the path which the vehicle is immediately traveling or about to take, such path being determined by the position or disposition of the steering-gear of the vehicle and not by the position of the vehicle as a whole.

As shown in full lines in the first view, the controller is normally disposed, with the operating arm 34 holding the connecting-rod 31 at right-angles to the arm 29, the lever 27 and the arm 20 in line with each other, through the medium of said arm 29 and the post 10, (the pivot 28 now being in the front end of the slot 24), and the frames 16 parallel with the axle 4, through the medium of the above-mentioned intervening parts and members and the post 12 to which said arm 20 is attached, the connecting-rod 22, the arm 21 and the other post 12. If, now, the steering-knuckle 5 be actuated to the left, so as to turn the vehicle in that direction, the operating arm 34 is swung toward the rear and draws back the connecting-rod 31, this action on the part of said connecting-rod partially rotates the post 10, through the medium of the arm 29, in such a way as to throw outwardly the lever 27 and with it the arm 21, the pivot 28 moving from the front to the back end of the slot 24, and the outward movement of said arm 21 partially rotates the connected post 12 and with it the other post 12, through the medium of the connecting-rod 22 and the arm 21, and so actuates the lamp frames in the same direction with said steering-knuckle and the wheel 6. It is understood, of course, that the other front wheel is moved with the one represented herein.

The operation just described disposes the parts as represented by dot-and-dash lines at 40, in Fig. 1. From the foregoing, it is clear how a partial rotation of the steering-knuckle to the right, from initial position, causes the lamp frames to move in the same direction and the parts to assume the positions represented by dot-and-dash lines at 41, in Fig. 1, also how said frames are returned to normal position after being turned out of such position in either direction. It may be observed, however, that, during the act of turning the frames 16 to the right, the connecting-rod 31 is advanced by the operating arm 34 in its forward movement, the arm 29 is swung forward, and the lever 27 and the arm 20 are actuated inward, the pivot 28 moving to the back end of the slot 24 as before; furthermore, that, when the return of the parts to normal position is made, after either displacement, said lever and arm 20 are brought into alinement again, with said pivot 28 in the forward end of said slot 24. The stay-rod 25 does not move, as does the connecting-rod 22, but simply serves in the capacity of a support for the frames 16 at the top and provides axes about which said frames turn.

The several connecting and operating or actuating members will be made longer or shorter to meet the requirements of different machines.

What I claim as my invention, and desire to secure by Letters Patent, is—

1. The combination, in a head-light controller, with supporting parts and a steering-knuckle of a vehicle, of posts rotatably mounted on such supporting parts, lamp frames mounted on said posts and arranged to turn therewith, arms rigidly attached to said posts, a connecting-rod between said arms, another post rotatably mounted on one of said supporting parts, a lever and an arm rigidly attached to said last-mentioned post, a loose pivotal connection between said lever and the contiguous arm from the adjacent lamp-frame post, an operating arm secured to said steering-knuckle, and a connecting-rod between said operating arm and the lever-associated arm.

2. The combination, in a head-light controller, with supporting parts and a steering-knuckle of a vehicle, of posts rotatably mounted on such supporting parts, lamp frames mounted on said posts and arranged to turn therewith, a stay-rod in supporting relation to said frames at the top, means to support said stay-rod from the front of the vehicle, arms rigidly attached to said posts, a connecting-rod between said arms, another post rigidly mounted on one of said supporting parts, a lever and an arm rigidly attached to said last-mentioned post, a loose pivotal connection between said lever and the contiguous arm from the adjacent lamp-frame post, an operating arm secured to said steering-knuckle, and a connecting-rod between said operating arm and the lever-associated arm.

3. The combination, in a head-light controller, with supporting parts and a steering-knuckle of a vehicle, of a pair of brackets fastened to said supporting parts, posts having angular stems and mounted to rotate in said brackets, lamp frames fitted to said angular stems, arms also fitted to said stems, a connecting-rod pivotally attached to said arms, another bracket fastened to one of said supporting members, a third post journaled in said last-mentioned bracket, said third post having angular stems, a lever and an arm fitted to said last-mentioned stems, a loose pivotal connection between said lever and the contiguous arm from the adjacent lamp-frame post, an operating arm secured to said steering-knuckle, and a connecting-rod between said operating arm and the lever-associated arm.

4. The combination, in a head-light controller, with supporting parts and a steering-knuckle of a vehicle, of a pair of brackets fastened to said supporting parts, posts having angular stems and mounted to rotate in said brackets, lamp frames fitted to said angular stems, a rod projecting from the front of the vehicle, a stay-rod attached to said projecting rod and having its ends in supporting pivotal connection with the top of said frames, arms also fitted to said stems, a connecting-rod pivotally attached to said arms, another bracket fastened to one of said supporting members, a third post journaled in said last-mentioned bracket, said last-mentioned post having angular stems, a lever and an arm fitted to said last-mentioned stems, a loose pivotal connection between said lever and the contiguous arm from the adjacent lamp-frame post, an operating arm secured to said steering-knuckle, and a connecting-rod between said operating arm and the lever-associated arm.

ANDREW JANISHEFSKI.

Witnesses:
F. A. CUTTER,
A. C. FAIRBANKS.

---

Copies of this patent may be obtained for five cents each, by addressing the "Commissioner of Patents, Washington, D. C."